(12) United States Patent
Llona

(10) Patent No.: US 6,539,665 B1
(45) Date of Patent: Apr. 1, 2003

(54) PLANTER HAVING A VERTICAL RABBET FOR CONFORMALLY ENGAGING AN UPRIGHT ELONGATE MEMBER

(76) Inventor: Marcos Llona, 141 Pinehurst Dr., Shelburne, VT (US) 05482

( * ) Notice: Subject to any disclaimer, the term of this patent is extended or adjusted under 35 U.S.C. 154(b) by 1 day.

(21) Appl. No.: 09/713,436

(22) Filed: Nov. 15, 2000

Related U.S. Application Data

(60) Provisional application No. 60/165,870, filed on Nov. 16, 1999.

(51) Int. Cl.$^7$ .................................................. A01G 9/02
(52) U.S. Cl. ........................... 47/65.5; 47/67; 47/66.6; 47/41.14; 248/318; 248/27.8; 206/423
(58) Field of Search .................. 47/65.5, 66.6, 47/66.7, 67, 68, 86, 87, 39, 40, 41.14, 63, 41.01; D11/143, 155, 156, 152, 153, 154, 164; 248/27.8, 218.4, 225.11, 225.21, 214, 228, 44, 318, 327; 206/423; 40/607

(56) References Cited

U.S. PATENT DOCUMENTS

| | | | |
|---|---|---|---|
| 409,925 A | * | 8/1889 | Cleland |
| 997,361 A | | 7/1911 | Atlee |
| 1,421,327 A | | 6/1922 | Waters |
| 1,499,473 A | | 7/1924 | Price |
| 1,683,271 A | | 9/1928 | Thompson et al. |
| 1,701,690 A | * | 2/1929 | Mueller |
| 2,720,056 A | | 10/1955 | Levy .............................. 47/41 |
| 3,717,258 A | * | 2/1973 | McKinnon |
| 3,747,268 A | * | 7/1973 | Linder ........................... 47/34 |
| D278,521 S | * | 4/1985 | Baird et al. ................. D11/153 |
| 4,711,419 A | * | 12/1987 | Polosky .................... 248/225.2 |
| 4,837,972 A | | 6/1989 | Reed ............................... 47/67 |
| 4,896,456 A | * | 1/1990 | Grant .............................. 47/67 |
| 4,991,345 A | | 2/1991 | Bloch ............................. 47/79 |
| 5,220,744 A | * | 6/1993 | Kendall ......................... 47/39 |
| 5,435,099 A | | 7/1995 | Conway ......................... 47/66 |
| D386,114 S | * | 11/1997 | Carson ....................... D11/143 |
| 6,044,585 A | * | 4/2000 | Carruth et al. ............... 47/65.5 |
| 6,085,459 A | * | 7/2000 | Conner ....................... 47/41.01 |
| D444,734 S | * | 7/2001 | Penney ....................... D11/153 |
| 6,269,589 B1 | * | 8/2001 | Bouler ........................ 47/65.5 |

FOREIGN PATENT DOCUMENTS

| | | | | |
|---|---|---|---|---|
| DE | 4319474 A1 | * | 12/1994 | ........... A47G/7/04 |
| GB | 2212374 | * | 7/1989 | ........... A01G/9/02 |
| JP | 54-026525 | * | 2/1979 | .......... E04D/13/08 |
| JP | 54-104021 | * | 8/1979 | .......... E04D/13/08 |

* cited by examiner

*Primary Examiner*—Peter M. Poon
*Assistant Examiner*—Andrea Valenti
(74) *Attorney, Agent, or Firm*—Downs Rachlin Martin PLLC

(57) ABSTRACT

A planter (10) having a vertical rabbet (12) for conformally engaging a post (14). The planter comprises a sidewall (18) and a bottom wall (20) that together define a cavity (22) for receiving potting soil or other material for supporting one or more plants and/or other items. A first portion (24) of the sidewall extends into the cavity to define the rabbet. A second portion (26) of the sidewall is preferably circular in shape and tapered so that the cavity is generally frusto-conical in shape. The rabbet includes a front face (28), a first lateral face (30) and a second lateral face (32), each for confronting a corresponding face of the post.

5 Claims, 4 Drawing Sheets

PLANTER HAVING A VERTICAL RABBET FOR CONFORMALLY ENGAGING AN UPRIGHT ELONGATE MEMBER

CROSS REFERENCE TO RELATED APPLICATION

This application claims the benefit of priority of U.S. Provisional Application Serial No. 60/165,870, filed Nov. 16, 1999, entitled "Decorative Planter."

FIELD OF INVENTION

The present invention generally relates to the field of containers. More particularly, the present invention is a planter having a vertical rabbet for conformally engaging an upright elongate member.

BACKGROUND OF THE INVENTION

Often it is desirable to conceal and decorate support members, such as mailbox posts, newel posts, lampposts, flag poles and similar structures, which are often stark and unattractive. For example, one method of concealing/decorating such support members is to provide flowers and/or other plants adjacent the support member, either by planting the plants in the ground surrounding the support member or in an elevated planter supported by the support member.

Over the years, a number of elevated planters have been developed for concealing/decorating posts and other upright elongate members. However, each of these planters has one or more drawbacks. For example, U.S. Pat. No. 1,499,473 to Price, U.S. Pat. No. 1,683,271 to Thompson et al. and U.S. Pat. No. 3,747,268 to Linder each show a circular planter for a vertical post, such as a lamppost. Each of these planters comprises two semicircular halves, each having a groove for receiving a portion of the post therein. In each of the Price and Lander planters, the semicircular halves are bolted to one another so that the semicircular halves clampingly engage the portion of the post located in the corresponding grooves. In Thompson et al., the planter disclosed therein engages a separate support, or bracket ring, that wedgingly engages the supporting post. A disadvantage of these planters is that they completely surround the post and are not adaptable for the situation in which it is desired for aesthetics, or necessary for access, to have a planter located primarily on only one side of the post. In addition, each of the planters does not include fasteners for mechanically attaching the planters to the corresponding posts. Moreover, each of these planters has two separate cavities, one in each semicircular half.

U.S. Pat. No. 4,837,972 to Reed shows a plant pot for hanging on a support, such as a rectangular post, having a planar vertical face. The plant pot includes a generally circular bottom wall and a generally frusto-conical sidewall. The sidewall includes a lateral wedgeshaped projection having a vertical flat surface for engaging the vertical face of the support. A disadvantage of the Reed plant pot is that, when attached to a post, it is not visually integrated with the post and is thus not aesthetically pleasing. In addition, the means for attaching the Reed plant pot to a post is not very robust and appears to permit the plant pot to be rotated about the single mechanical fastener and may not adequately support the weigh of a relatively large pot laden with soil and/or other planting material.

As described below, the planter of the present invention advantageously overcomes the foregoing and other disadvantages of conventional planters.

SUMMARY OF THE INVENTION

In one aspect, the present invention is directed to a container for engaging a generally upright elongate member. The elongate member has a first end, a second end located upward from the first end and a support portion located between the first and second ends. The support portion has a longitudinal confronting surface. The container comprises a bottom wall having an outer periphery and an upper surface. A sidewall having a lower end is attached to the bottom wall at the outer periphery and extends upward from the upper surface of the bottom substantially vertical rabbet is formed in the sidewall and has a depth extending into the cavity not beyond the central longitudinal axis. The rabbet is shaped to conformally confront the longitudinal confronting surface of the generally upright elongate member. Except for the vertical rabbet, the cavity has two mutually perpendicular axes of symmetry.

In another aspect, the present invention is directed to a planter system. The planter system includes a generally upright elongate member having a first end, a second end located upward from the first end and a support portion located between the first and second ends. The support portion has a longitudinal confronting surface. The planter system further includes a container comprising a bottom wall having an outer periphery and an upper surface. A sidewall has a lower end attached to the bottom wall at the periphery and extends upward from the upper surface of the bottom wall. The sidewall and the bottom wall define a cavity. A substantially vertical rabbet is formed in a portion of the sidewall and has a depth extending into the cavity. The vertical rabbet conformally confronts the longitudinal confronting surface of generally upright elongate member.

BRIEF DESCRIPTION OF THE DRAWINGS

For the purpose of illustrating the invention, the drawings show forms of the invention that are presently preferred. However, it should be understood that the present invention is not limited to the precise arrangements and instrumentalities shown in the drawings.

DETAILED DESCRIPTION OF THE INVENTION

Figure 1:
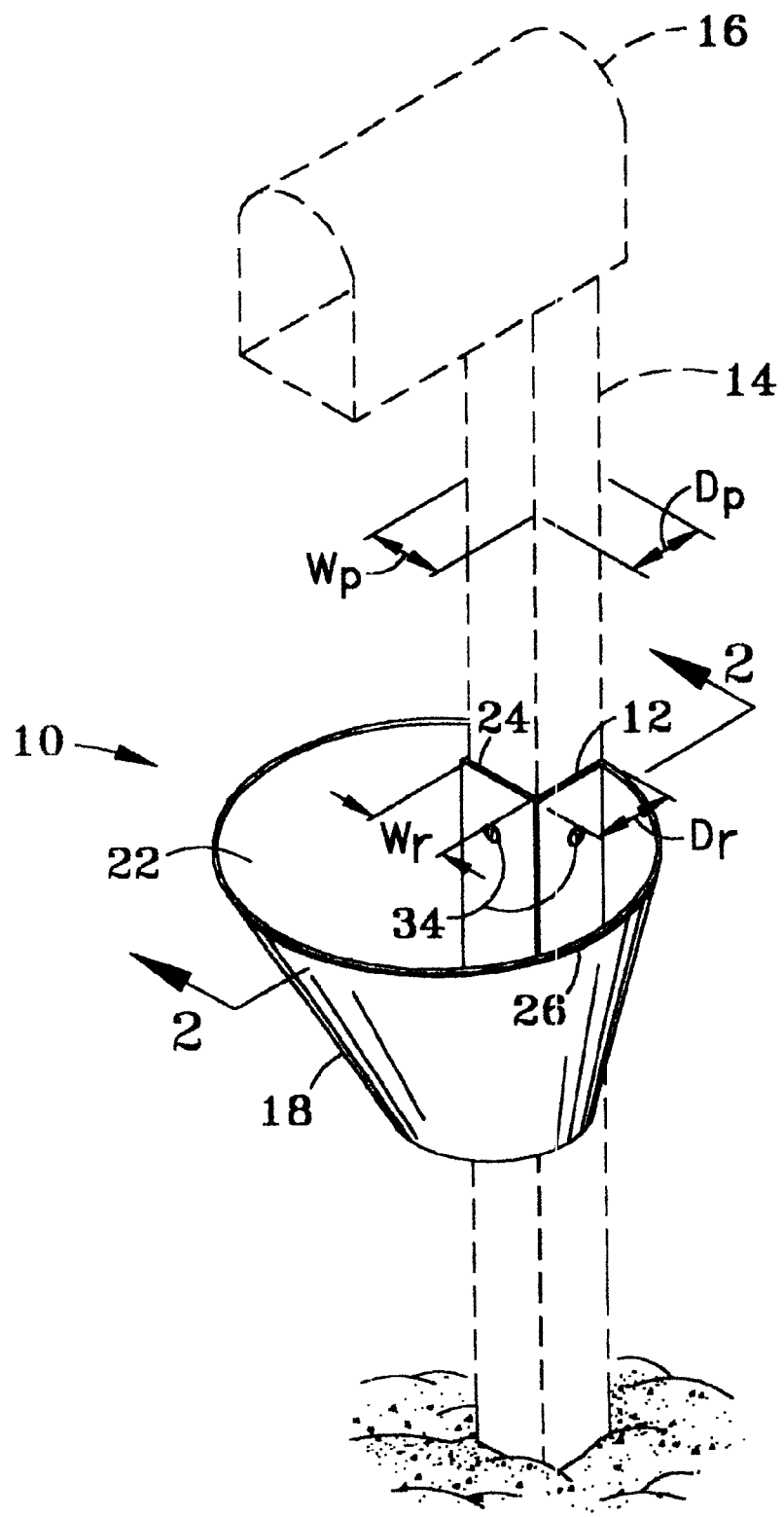
FIG. 1 is a perspective view illustrating a planter according to the present invention.
Figure 2:
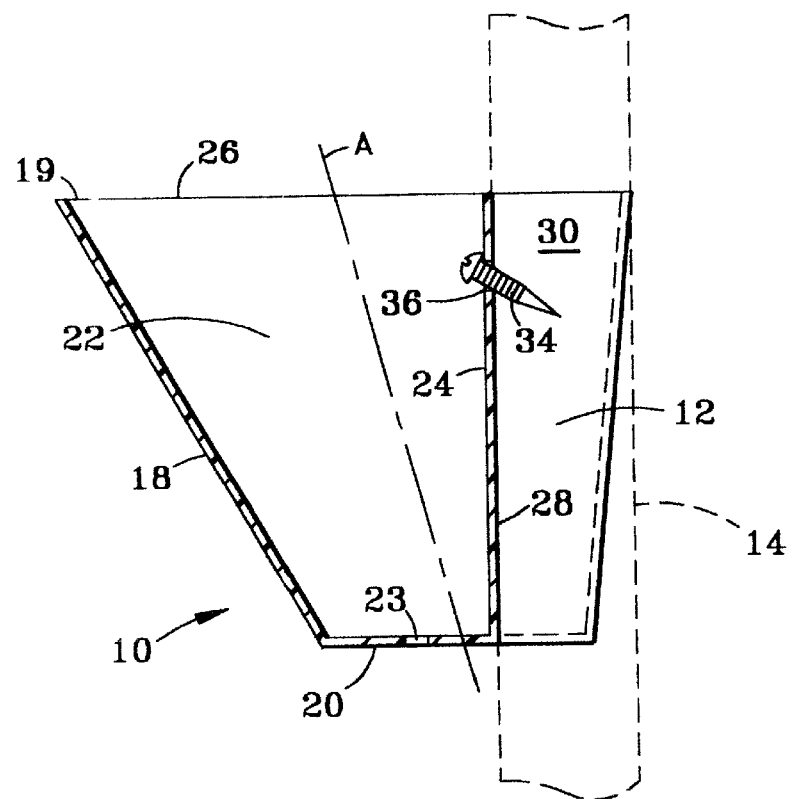
FIG. 2 is an enlarged cross-sectional view of the planter as taken along line 2—2 of FIG. 1.
Figure 3:
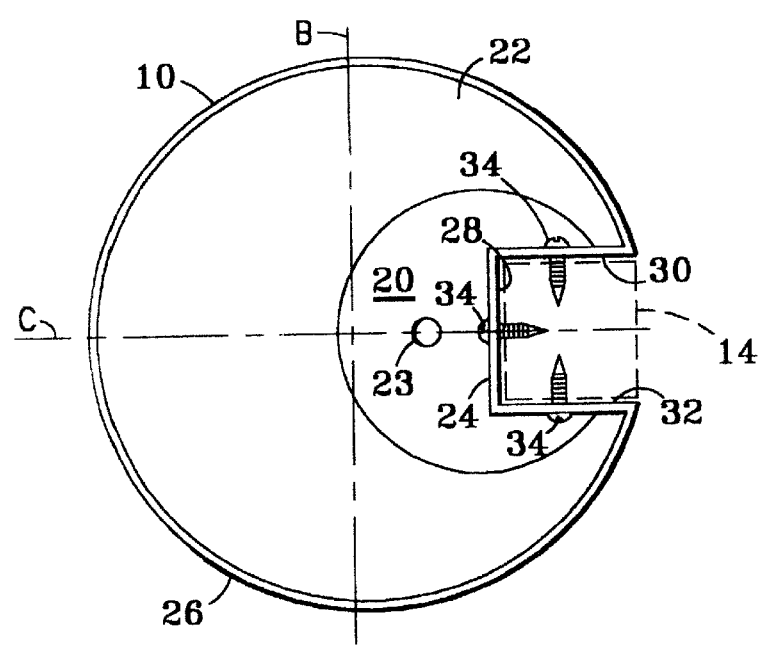
FIG. 3 is an enlarged plan view of the planter of FIG. 1.

Referring now to the drawings, wherein like numerals indicate like elements, FIGS. 1–3 illustrate in accordance with the present invention a planter, which is designated generally by the numeral 10. Planter 10 includes a rabbet 12 for conformally engaging an upright elongate member, such as mailbox post 14, which has a mailbox 16 located at its upper end. Rabbet 12 allows planter 10 to be securely attached to post 14 in a manner that gives the planter the appearance that it is integral with the post, or at least aesthetically linked with the post. Although the present embodiment of the invention is a planter, the present invention also encompasses similar containers for containing materials other than plants and related materials.

One skilled in the art will appreciate that various and diverse planters may be made in accordance with the present invention. In addition to the variations described below, rabbet 12 may be adapted for attaching a planter of the present invention to an elongate member that is not vertical, but rather tilted forward, backward or to one side or the other. In addition, rabbet 12 may be adapted for an elongate member having a cross-section that is not uniform in size and/or cross-sectional shape. Moreover, two or more rabbets may be provided on a single planter for conformally engaging two or more support posts, such as a three or four-legged stand supporting one or more planters of the present invention.

Planter 10 comprises a sidewall 18 having an upper end 19 and further comprises a bottom wall 20 that together with sidewall 18 define a cavity 22 for receiving potting soil (not shown) or other material for supporting one or more plants (not shown) and/or other items such as a trellis or decorative item. Cavity 22 has a central longitudinal axis, such as central longitudinal axis A shown in FIG. 2, which extends along the geometric centerline that cavity 22 would have without rabbet 12. For example, if cavity 22 would be cylindrical in the absence of rabbet 12, central longitudinal axis A would be at the concentric center of such cylmdrical cavity.

Sidewall 18 and bottom wall 20 are preferably made of plastic and molded integrally with one another. However, other materials, such as metal and ceramic, may be used, and the various components may be formed separately and attached to one another by means such as adhesive bonding, heat bonding, welding and mechanical fastening, among others. Bottom wall 20 is preferably provided with at least one drain hole 23, which allows excess water from overwatering, rain, melting snow or the like to drain from cavity 22.

A first portion 24 of sidewall 18 extends into cavity 22 to define rabbet 12. A second portion 26 of sidewall 18 is preferably circular in shape and tapered so that cavity 22 is generally frusto-conical in shape. However, second portion 26 of sidewall 18 need not be tapered and may be another arcuate shape such as oval, comprise a plurality of linear segments forming a polygonal shape (such as the octagonal shape shown in FIG. 5) or may form any other shape desired. Preferably, upper end 19 of sidewall 18, except at the protrusion of first portion 24, has two mutually perpendicular axes of symmetry, such as axes C and D of FIG. 3.

Rabbet 12 includes a front face 28, a first lateral face 30 and a second lateral face 32, each for confronting a corresponding face of post 14. Lateral faces 30, 32 are spaced from one another by a distance $W_r$ that is slightly greater that width $W_p$ of post 14 so that lateral faces 30, 32 slidingly engage the corresponding faces of the post when planter 10 is being installed on the post. Front face 29 is adapted to contact the corresponding face of post 14. Although faces 28, 30, 32 of rabbet 12 are preferably designed to contact the corresponding faces of post 14, this need not be so. Faces 28, 30, 32 may be adapted to be spaced from the corresponding faces of post 14 so that a spacer, such as a double-sided adhesive pad, a washer, a mounting bracket (such as the mounting bracket shown in FIG. 4) or other structure may be interposed between faces 28, 30, 32 and the post.

Planter 10 is preferably secured to post 14 with mechanical fasteners, such as screws 34 extending through corresponding apertures 36 in faces 28, 30, 32. Apertures 36 may be any shape such as circular, slotted or the like. In addition, each aperture 36 may include a vertical slot (not shown) having a wide region and a narrow region located above and continuous with the wide region so that screws 34 may be inserted into post 14 prior to securing planter 10 to the post. In this scenario, screws 34 are driven into post 14 so that the heads of the screws are spaced from the post. The wide region of the vertical slot is sized to be larger than the head of screws 34 and the narrow region is sized to be smaller than the screw head but larger than shank of the screw so that planter 10 can be secured to post 14 by sliding the wide region over the screw head and engaging the upper end of the narrow region with the screw shank.

Of course, one skilled in the art will recognize that other means of fastening planter 10 to post 14, such as nails, bolts and adhesive, among others, may be used. In addition, more or fewer fasteners than shown may be used, depending upon various design parameters such as the weight of laden planter 10, strength of sidewall 18, capacity of the individual fasteners, strength of the material of post 14 and magnitude of environmental loads, e.g., wind and snow. In addition to the foregoing means for securing planter 10 to post 14, the planter of the present invention may be removably attached to a post, e.g., using a mounting bracket 38 as shown in FIG. 4.

Figure 4:
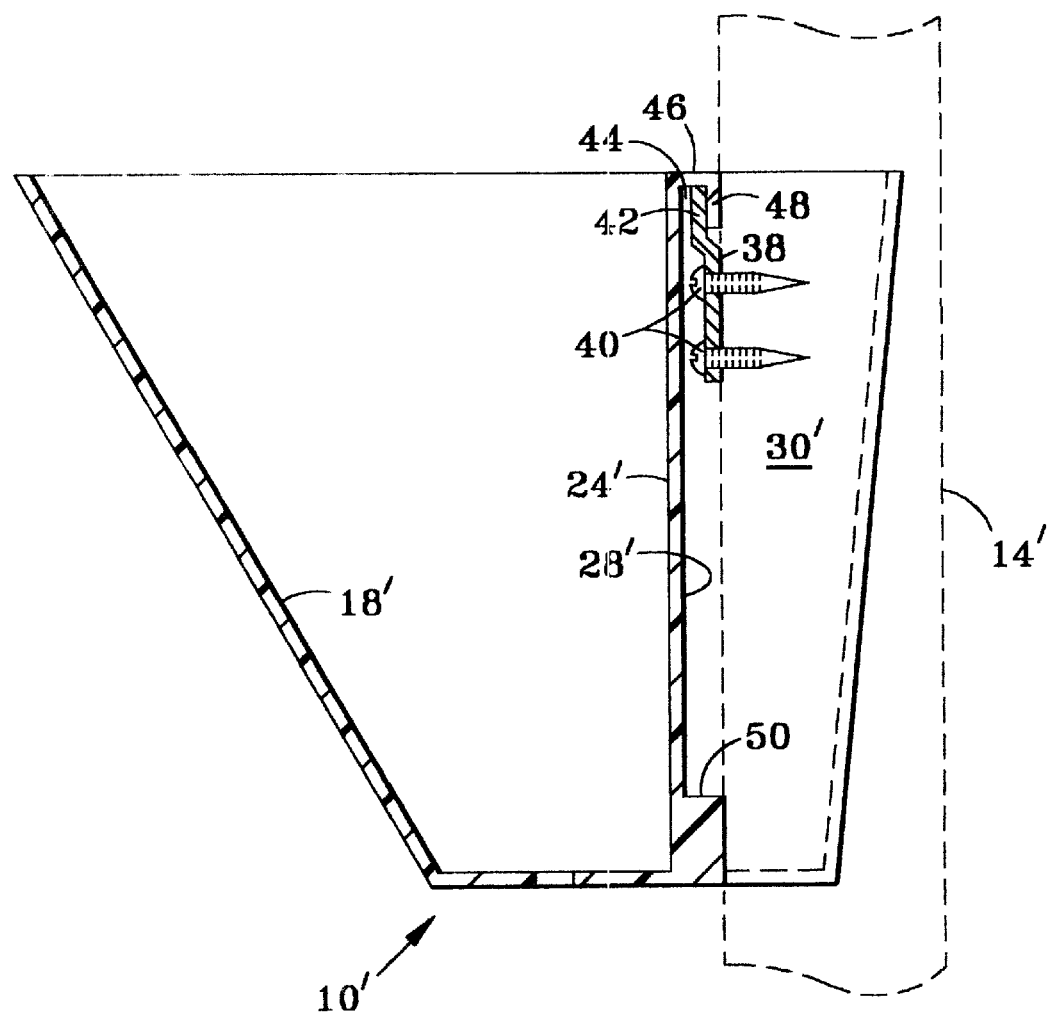
FIG. 4 is a cross-sectional view of an alternative embodiment of the planter of the present invention, showing an alternative means for attaching the planter to a post.

Referring now to FIG. 4, mounting bracket 38 is secured to post 14' using one or more mechanical fasteners, such as screws 40, and has a projection 42 spaced from post 14' for engaging a corresponding receiver 44 located adjacent front wall 24' of rabbet 12'. For relatively large planters, mounting bracket 38 is preferably made of metal, but for relatively small planters, mounting bracket may be made of plastic Receiver 44 is formed, e.g., by providing first portion 24' of sidewall 18' with an outwardly turned lip 46 having a downward extension 48 spaced from front face 28'.

To accommodate mounting bracket 38 between front face 28' and the corresponding confronted face of post 14', front face 28' is spaced from the post by an offset. To compensate for this offset, a bumper 50 may be provided at the bottom of front face 28' or in other spaced relationship to extension 48. Alternatively, first portion 24' of sidewall 18' may include a depression (not shown) only at mounting bracket 38, allowing substantially all of front face 28' to contact post 14'. Although only one mounting bracket is shown, similar mounting brackets may additionally, or alternatively be provided on the faces of post 14' confronting first lateral face 30' and second lateral face (not shown). In addition, one skilled in the art will recognize that there are many variations of mounting brackets and other fasteners that may be provided for removably attaching planter 10' to post 14'.

Referring again to FIGS. 1–3, maximum depth $D_r$ of rabbet 12 is preferably equal to depth $D_p$ of post 14 so that a portion of sidewall 18 adjacent the rabbet is flush with the back of the post. This appears to provide the most visually aesthetic planter/post combination. However, other depths of $D_r$ may be used, although such other depths are preferably less than $D_p$. With tapered sidewall 18, maximum depth $D_r$ occurs at the upper end of the sidewall. If a non-tapered sidewall is provided and maximum depth $D_r$ is equal to $D_p$, maximum depth $D_r$ will occur along the entire length of rabbet 12.

In alternative embodiments, planter 10 may be adapted for use with posts having cross-sectional shapes other than rectangular. Consequently, maximum depth $D_r$ should be varied to suit the particular cross-sectional shape of the post.

Figure 5:
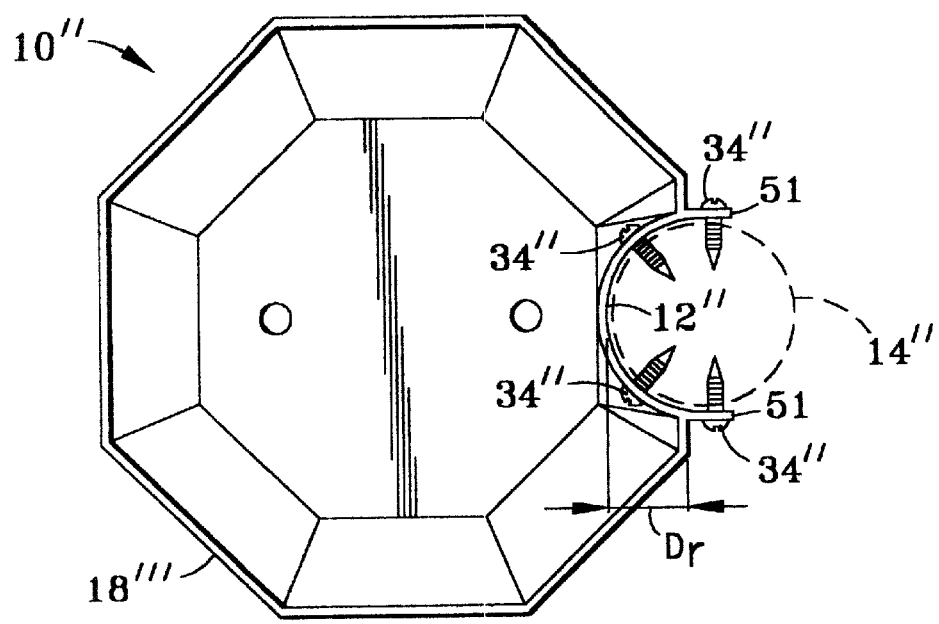
FIG. 5 is a plan view of another alternative embodiment of the planter of the present invention.

For example, as shown in FIG. 5, if a circular post is provided, corresponding rabbet 12" preferably should have a semicircular shape such that depth $D_r$' is substantially equal to the radius of the post. If the entire depth, or diameter, of the post were used, the rabbet would be generally U-shaped and portions of the rabbet would extend beyond the vertical centerline of post 14", creating a less visually attractive planter/post combination.

FIG. 5 also shows an alternative means for securing planter 10" to post 14", namely tabs 51 attached to sidewall 18" at the longitudinal edges of rabbet 12". Each tab 51 includes at least one aperture (not shown) for receiving a mechanical fastener, such as screw 34". Each tab 51 may be strip extending the entire length of rabbet 12" or alternatively an extension extending only a portion of the entire length of rabbet 12". In addition, e.g., a plurality of tabs 51 may be provided along each longitudinal edge of rabbet 12" and each tab provided with a single aperture.

Figure 6:
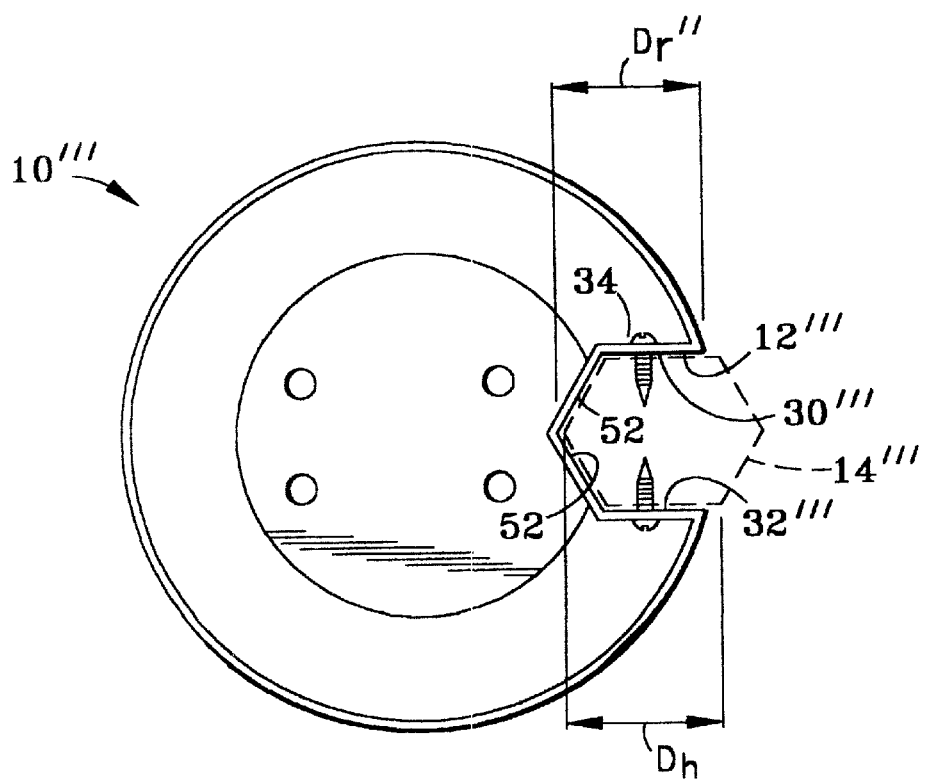
FIG. 6 is a plan view of yet another alternative embodiment of the planter of the present invention.

In another example, as shown in FIG. 6, a planter 10''' of the present invention is adapted for use with a post 14''' having a hexagonal cross-sectional shape. In this embodiment, rabbet 12''' is preferably shaped so that it has two lateral faces 30''', 32''' and two front faces 52 for conformably engaging the corresponding faces of post 14'''. To provide a visually appealing application, maximum depth $D_r$''' of rabbet 12''' should preferably be equal to dimension $D_h$ shown in FIG. 6 so that lateral faces 30''', 32''' do not extend beyond the faces of post 14''' they contact.

While the present invention has been described in connection with a preferred embodiment and particular alternative embodiments, it will be understood that it is not so limited. On the contrary, it is intended to cover all alternatives, modifications and equivalents as may be included within the spirit and scope of the invention as defined in the appended claims.

What is claimed is:

1. A container for engaging a generally upright elongate member having a first end, a second end located upward from the first end and a support portion located between the first and second ends, the support portion having a longitudinal confronting surface, the container comprising:
    a sidewall defining the sides of a cavity and circumscribing a central axis, said sidewall including:
        an upper end;
        a lower end spaced from said upper end; and
        a vertical rabbet extending into said cavity for receiving therein the longitudinal confronting surface of the upright elongate member and having a vertical plane of symmetry;
        wherein said upper end of said sidewall has a horizontal axis orthogonal to said vertical plane of symmetry and extending through said central axis, said upper end including:
            a first portion extending from said vertical rabbet to said horizontal axis on one side of said vertical plane of symmetry such that said first portion extends away from said vertical rabbet in a direction substantially perpendicular to said vertical plane of symmetry and has a change in direction between said vertical rabbet and said horizontal axis no greater than 90°; and
            a second portion extending from said vertical rabbet to said horizontal axis on the other side of said vertical plane of symmetry such that said second portion extends away from said vertical rabbet in a direction substantially perpendicular to said vertical plane of symmetry and has a change in direction between said vertical rabbet and said horizontal axis no greater than 90°; and
    a bottom wall attached to said sidewall at said lower end;
    wherein the upright elongate member has a rectangular transverse cross-sectional shape having a depth D extending horizontally along said vertical plane of symmetry when the container is engaged with the upright elongate member, said rabbet having a shape for conformably engaging the upright elongate member and a maximum depth extending horizontally along said vertical plane of symmetry substantially equal to depth D.

2. A container for engaging a generally upright elongate member having a first end, a second end located upward from the first end and a support portion located between the first and second ends, the support portion having a longitudinal confronting surface, the container comprising:
    a sidewall defining the sides of a cavity and circumscribing a central axis, said sidewall including:
        all upper end;
        a lower end spaced from said upper end; and
        a vertical rabbet extending into said cavity for receiving therein the longitudinal confronting surface of the upright elongate member and having a vertical plane of symmetry;
        wherein said upper end of said sidewall has a horizontal axis orthogonal to said vertical plane of symmetry and extending through said central axis, said upper end including:
            a first portion extending from said vertical rabbet to said horizontal axis on one side of said vertical plane of symmetry such that said first portion extends away from said vertical rabbet in a direction substantially perpendicular to said vertical plane of symmetry and has a change in direction between said vertical rabbet and said horizontal axis no greater than 90°; and
            a second portion extending from said vertical rabbet to said horizontal axis on the other side of said vertical plane of symmetry such that said second portion extends away from said vertical rabbet in a direction substantially perpendicular to said vertical plane of symmetry and has a change in direction between said vertical rabbet and said horizontal axis no greater than 90°,
    a bottom wall attached to said sidewall at said lower end; and
    a first tab and a second tab, said first tab attached to the container at the juncture between said first portion of said sidewall and said vertical rabbet and extending in a direction substantially parallel to said vertical plane of symmetry, said second tab attached to the container at the juncture between said second portion of said sidewall and said vertical rabbet and extending in a direction substantially parallel to said vertical plane of symmetry.

3. A container for engaging a generally upright elongate member having a first end, a second end located upward from the first end and a support portion located between the first and second ends, the support portion having a longitudinal confronting surface, the container comprising:
    a sidewall defining the sides of a cavity and circumscribing a central axis, said sidewall including:
        an upper end;
        a lower end spaced from said upper end; and
        a vertical rabbet extending into said cavity for receiving therein the longitudinal confronting surface of the upright elongate member and having a vertical plane of symmetry:

wherein said upper end of said sidewall has a horizontal axis orthogonal to said vertical plane of symmetry and extending through said central axis said upper end including:

a first portion extending from said vertical rabbet to said horizontal axis on one side of said vertical plane of symmetry such that said first portion extends away from said vertical rabbet in a direction substantially perpendicular to said vertical plane of symmetry and has a change in direction between said vertical rabbet and said horizontal axis no greater than 90°; and a second portion extending from said vertical rabbet to said horizontal axis on the other side of said vertical plane of symmetry such that said second portion extends away from said vertical rabbet in a direction substantially perpendicular to said vertical plane of symmetry and has a change in direction between said vertical rabbet and said horizontal axis no greater than 90°; and a bottom wall attached to said sidewall at said lower end;

wherein said vertical rabbet includes a bumper located adjacent said lower end of said sidewall that protrudes in a direction horizontally along said vertical plane of symmetry.

4. A planter system, comprising:

a generally upright elongate member having a first end, a second end located upward from said first end, an outer periphery, and a support portion located between said first and second ends, said support portion having a longitudinal confronting surface that does not extend around the entirety of said outer periphery; and a container, comprising:

a sidewall defining the sides of a cavity and circumscribing a central axis, said sidewall including:

an upper end;

a lower end spaced from said upper end; and a vertical rabbet extending into said cavity, receiving said longitudinal confronting surface of the upright elongate member, and having a vertical plane of symmetry;

wherein said upper end of said sidewall has a horizontal axis orthogonal to said vertical plane of symmetry and extending through said central axis, said upper end including:

a first portion extending from said vertical rabbet to said horizontal axis on one side of said vertical plane of symmetry such that said first portion extends away from said vertical rabbet in a direction substantially perpendicular to said vertical plane of symmetry and has a change in direction between said vertical rabbet and said horizontal axis no greater than 90°; and a second portion extending from said vertical rabbet to said horizontal axis on the other side of said vertical plane of symmetry such that said second portion extends away from said vertical rabbet in a direction substantially perpendicular to said vertical plane of symmetry and has a change in direction between said vertical rabbet and said horizontal axis no greater than 90°; and a bottom wall attached to said sidewall at said lower end;

wherein said upright elongate member has a rectangular transverse cross-sectional shape having a depth D extending horizontally along said vertical plane of symmetry, said rabbet having a shape for conformally engaging said upright elongate member and a maximum depth extending horizontally along said vertical plane of symmetry substantially equal to depth D.

5. A planter system, comprising:

a generally upright elongate member having a first end, a second end located upward from said first end, an outer periphery, and a support portion located between said first and second ends, said support portion having a longitudinal confronting surface that does not extend around the entirety of said outer periphery; and a container, comprising:

a sidewall defining the sides of a cavity and circumscribing a central axis, said sidewall including:

an upper end, a lower end spaced from said upper end; and a vertical rabbet extending into said cavity, receiving said longitudinal confronting surface of the upright elongate member, and having a vertical plane of symmetry;

wherein said upper end of said sidewall has a horizontal axis orthogonal to said vertical plane of symmetry and extending through said central axis, said upper end including:

a first portion extending from said vertical rabbet to said horizontal axis on one side of said vertical plane of symmetry such that said first portion extends away from said vertical rabbet in a direction substantially perpendicular to said vertical plane of symmetry and has a change in direction between said vertical rabbet and said horizontal axis no greater than 90°; and a second portion extending from said vertical rabbet to said horizontal axis on the other side of said vertical plane of symmetry such that said second portion extends away from said vertical rabbet in a direction substantially perpendicular to said vertical plane of symmetry and has a change in direction between said vertical rabbet and said horizontal axis no greater than 90°;

a bottom wall attached to said sidewall at said lower end; and a first tab and a second tab, said first tab attached to the container at the juncture between said first portion of said sidewall and said vertical rabbet and extending in a direction substantially parallel to said vertical plane of symmetry, said second tab attached to the container at the juncture between said second portion of said sidewall and said vertical rabbet and extending in a direction substantially parallel to said vertical plane of symmetry.

* * * * *

UNITED STATES PATENT AND TRADEMARK OFFICE
CERTIFICATE OF CORRECTION

PATENT NO. : 6,539,665 B1
DATED : April 1, 2003
INVENTOR(S) : Marcos Llona

It is certified that error appears in the above-identified patent and that said Letters Patent is hereby corrected as shown below:

Column 6,
Line 10, delete "conformably" and insert -- conformally --.
Line 21, delete "all" and insert -- an -- therefor.

Signed and Sealed this

Twentieth Day of July, 2004

JON W. DUDAS
*Acting Director of the United States Patent and Trademark Office*